United States Patent [19]

Kruger

[11] Patent Number: 5,152,414
[45] Date of Patent: Oct. 6, 1992

[54] THERMOINSULATED CONTAINER WITH INTERNAL STRUCTURES, FOR RAPID COMPOSTING

[76] Inventor: Douglas J. Kruger, 3874 Ranchero Rd., Cedar Falls, Iowa 50613

[21] Appl. No.: 775,298

[22] Filed: Oct. 9, 1991

[51] Int. Cl.⁵ .............................................. B65D 6/24
[52] U.S. Cl. ................... 220/4.33; 220/4.28; 71/9
[58] Field of Search .................. 220/4.28, 4.29, 4.33, 220/4.34; 71/9, 4.24, 683

[56] References Cited

U.S. PATENT DOCUMENTS

| | | | |
|---|---|---|---|
| 2,575,069 | 11/1951 | Rankin et al. | 220/4.28 |
| 3,370,379 | 2/1968 | Gleason | 220/4.28 |
| 3,588,027 | 6/1971 | Bowden | 220/4.28 |
| 3,979,005 | 9/1976 | Robinson et al. | 220/4.28 |
| 4,691,824 | 9/1987 | Schindler | 220/4.28 |
| 5,052,570 | 10/1991 | Johansen | 220/4.33 |
| 5,258,409 | 3/1981 | Nattrass | 220/4.33 |

FOREIGN PATENT DOCUMENTS

| | | | |
|---|---|---|---|
| 86002 | 8/1895 | Fed. Rep. of Germany | 220/4.29 |
| 819250 | 9/1959 | United Kingdom | 220/4.29 |

Primary Examiner—Joseph Man-Fu Moy
Attorney, Agent, or Firm—Allan L. Harms

[57] ABSTRACT

An improved composting container comprising a plurality of panels fixed edge-to-edge to form a curved enclosure. Rods are inserted through some of the panels such that the rods form pyramidal shaped groups within the enclosure, in one hemisphere of the container. The panels are each thin walled enclosures having insulating spaces therein, with gas passageways passing through the panels. Straps are provided to maintain the panels in edge-wise interrelationships. Alternative embodiments provide towable and stationary composting devices.

10 Claims, 6 Drawing Sheets

THERMOINSULATED CONTAINER WITH INTERNAL STRUCTURES, FOR RAPID COMPOSTING

BACKGROUND OF THE INVENTION

This invention relates to containers, specifically to those containing the biodegradable plant waste called compost and to devices which facilitate rapid composting, or reduction of yard waste to the organic material called humus.

Many states have legislated the reduction of solid waste collected at public landfills. One such waste is yard waste such as grass clippings, leaves, and twigs. Composting is a natural, inexpensive solution to reducing the amount of yard waste collected in landfills, yet the majority of the public prefers not to do this process.

One reason for public apathy about composting is that present containers and technology are not compatible for today's high volume demands. Instead, presently available containers are designed for increasing existing fruit and vegetable harvest, and disposing of the organic matter that is not edible. Existing compost containers are viewed as producing a rotting mass of wet matter that has an unbearable odor.

Current compost bins look like their predecessors of thirty years ago. Many gardening magazines still embrace the old ways for instructing the consumer on building composting systems. Quite frequently, the stationary wooden slat or stationary wire mesh frame type container is still advertised as being "most desirable". Though the cost of these types of containers is low, consumers do not prefer them over newer, more aesthetic designs. Previous containers frequently lack any artistic styling and appear like oil drums, or cardboard boxes, or a stack of wooden pallets. These drawbacks in appearance discourage widespread consumer use, because the consumer is not able to hide an unsightly container.

Existing stationary compost bins produce an output product that is usually a wet mass of large clumps of semi-decayed matter combined with whole undecayed matter. This wet matter is then inefficiently separated with hand tools to break up the clumps into smaller clumps. Existing rotary containers offer a slightly more efficient process in reduction of clump size but are generally lacking in pleasing visual consumer appeal.

Existing compost containers were not designed to process compost though the use of microbe enriched catalysts. These catalysts can only by optimally utilized if the three major factors of moisture content, oxygen availability, and thermal drain are precisely balanced. Most stationary containers ignore the need for oxygen availability and moisture balance. Most rotary containers ignore the need for reducing thermal drain. Open stationary containers allow too much moisture fluctuation to occur due to being rained upon or allowing excess evaporation to occur.

Previous compost bin designs, both stationary and rotary, are now being redesigned with a rigid foam laminate for the purpose of insulating the hot composting mass from the cooler outside ambient temperatures. Insulating does promote a warmer environment for bacteria, and increases the rate of chemical reaction, but laminates are not as thermally efficient as air gap insulative design.

Presently, there are stationary compost containers that have air gap design, but are not capable of being rotated to break up wet clumps of humus into the smaller desired particle form; nor are those stationary air gap containers portable, which affects their convenient use. Since the stationary containers must be opened to be mixed and separated, internal temperature falls, and reaction rate reduces. There are rotary containers without gap design. They are mostly cylindrical, and most are to be located in an isolated, out-of-sight location for use, and are not portable.

Stationary containers do not offer the ability to break up large clumps without opening the container with resulting heat loss. The large clumps are two to five times more dense than surrounding material and consist of up to seventy percent minerals and compounds, and less than fifty percent fiber. The potential quantity of heat energy within a clump is two to five times that of the surrounding material. Thus the clumps can act as heat sources and can distribute heat extensively to the surrounding bacteria colonies, if broken up into smaller clumps without losing heat to the container exterior. Existing rotary containers break up these large clumps into smaller clumps but lose heat to the container exterior due to being under insulated. Stationary containers have a notorious hot spot, and subsequently have cool, low activity areas within, making compositing in the stationary container a less uniform and consequently longer process.

Previous rotary containers contain internal structures for aiding in mixing when the container is rotated. These structures do not provide a path from the core of the biomass to the container exterior for concentrations of gaseous reaction by-products to escape, or for a new supply of atmosphere to enter and react. Absence of this pathway when the rotary container is stationary, does not facilitate maximum biomass degradation. Therefore, existing enclosed rotary containers that only stir when rotated, will prematurely convert an aerobic reaction to anaerobic reaction, which is undesirable. Aerobic reactions are very desirable since they react up to sixteen times faster than anaerobic reactions, and the biproducts of aerobic reactions are primarily carbon dioxide, an odorless gas, instead of the odorous methane and ammonia. Existing stationary compositing containers complete between thirty-five and seventy-five percent of their compost cycle in an anaerobic reaction which explains their notorious bad smell.

Prior art containers, due to shape and construction materials, and size, do not appear in large quantities on the store shelves of retail department stores despite their low cost. This prevents the growth of composting as a widespread waste reduction method. Such stationary containers are marketed in boxes dimensionally as large as fifteen inches by thirty inches by thirty-two inches or larger. This size is usually too large to appear on retail department store shelves. Many rotary containers are made of metal and are of substantial weight, e.g. greater than forty pounds, which is too heavy for stocking on retail shelves.

Previous composting containers are inadequate for today's applications in the following ways:

a) stationary types do not process a volume high enough to keep up with weekly grass clipping volume, b) stationary and rotary types frequently are too unsightly in appearance to gain large public appeal, c) stationary types require tedious hand mixing where the operator of the container is thoroughly exposed to the odorous gases within the device, d) both stationary types and rotary types are usually not portable, e) many previous containers were not able to utilize today's microbe enriched catalysts and thus were not designed to precisely balance moisture content, oxygen availability, and thermal drain, f) previous containers are not in the shape of an insulated sphere which makes them less effective at redirecting heat back into the reaction biomass, g) previous insulated containers use foam laminate type insulation which is about thirty percent as effective as air gap type insulation, h) previous containers have no structures to create air/gas passages or air/gas exchange areas completely to the core of the biomass within, thus operating primarily in the undesirable anaerobic state, i) previous containers were not designed for compact lighweight packaging such as is necessary to facilitate stocking of large volumes of the containers on common retail department store shelves.

SUMMARY OF THE INVENTION

An improved rotatable composting container of a modular construction is provided. An insulated hollow spheroid is assembled from a plurality of curved plate segments which are detachably fixed edge to edge. Inwardly directed rod members protrude from a part of the outer surface of the spheroid inwardly to a central area within the spheroid. The rods form the perimeter of a pyramid and create a passage for gas transfer from the container core to the container exterior to minimize the resistance to gas flow as gases pass into and out of the core of the container. An optional draw member may be affixed to the sphere to cause its rotation and to move the container to alternate locations.

It is a primary object of this invention to provide a composting container to accept and decompose repeated weekly volumes of yard waste.

It is a further object of this invention to contain and process compost in a highly aesthetic rounded or curved shape that can be proudly placed at any location on the consumer's property.

It is a further object of this invention to provide a compost container which is portable by rolling, and which when rolled, will achieve stirring through rolling.

Another object of the invention is to provide an internal container which contains an environment conducive to rapid growth of bacteria.

Another object is to provide an insulated composting container using a trapped air gap within individual container panels.

A further object is to provide a composting container with rod-like structural members that protrude inwardly toward the container center, for the purpose of framing the perimeter of a gas passage, and for stirring the biomass when the container is rolled.

Another object is to provide a composting container with openings in the container wall to facilitate gas exchange by chemical reaction between the atmosphere and the container interior gas passages.

Another object of this container is to provide a compost container which allows easy emptying of internal contents without total disassembly of the container.

Another object of this invention is to provide a composting container of a modular lightweight type that, as presented on a retail department store shelf, is less than twenty-eight pounds in weight, and of dimensions less than twelve inches by twenty-four inches by twenty-four inches.

An additional object of this invention is to provide a composting container which minimizes the damage to the lawn or ground directly under the location of the container.

A further object of this invention is to provide a composting container which is fabricated from ultraviolet-stabilized, recyclable plastic or other light weight material with a low thermal conductivity coefficient, and which is available in aesthetically popular colors.

Further objects and advantages of this invention will become apparent from a consideration of the drawings and ensuing description.

DESCRIPTION OF THE DRAWING FIGURES

DESCRIPTION OF INVENTION

Figure 1A:
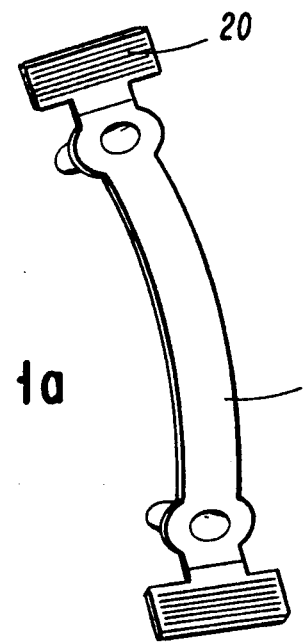
FIG. 1a showing a close up view of the strap of the invention.
Figure 1:
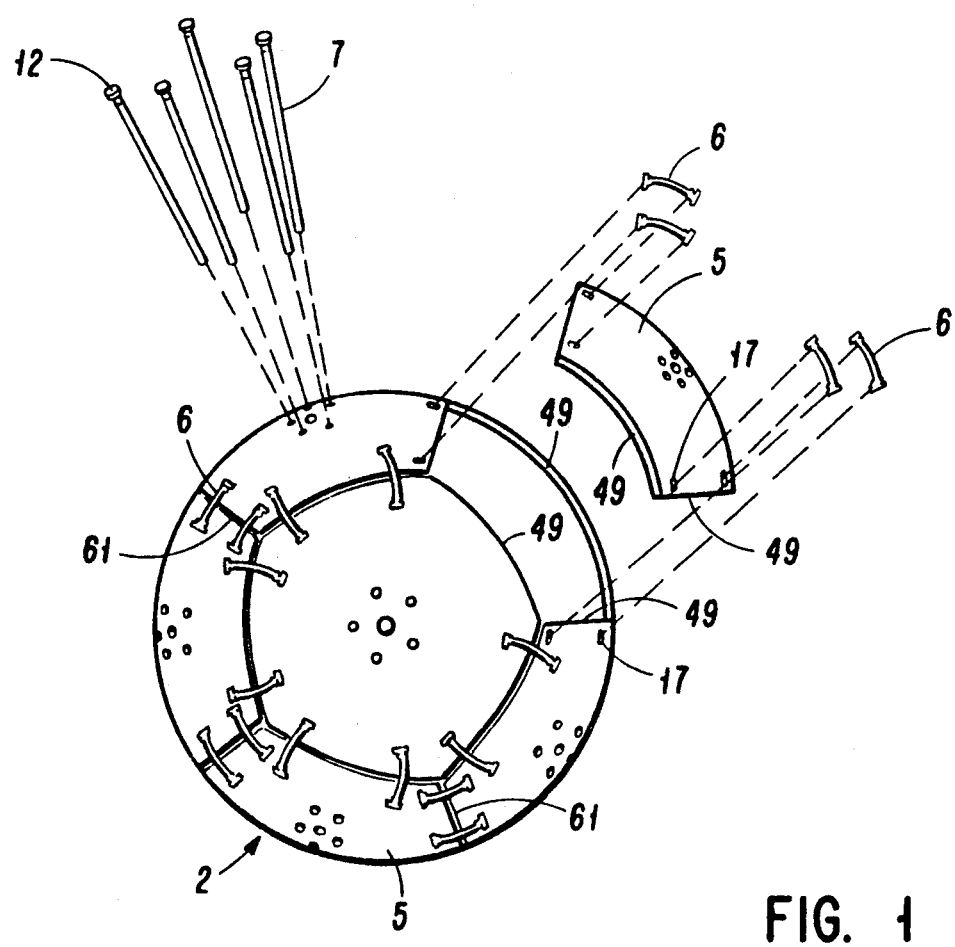
FIG. 1 is a front perspective view of the invention showing one panel and rods exploded from the assembled structure.
Figure 7:
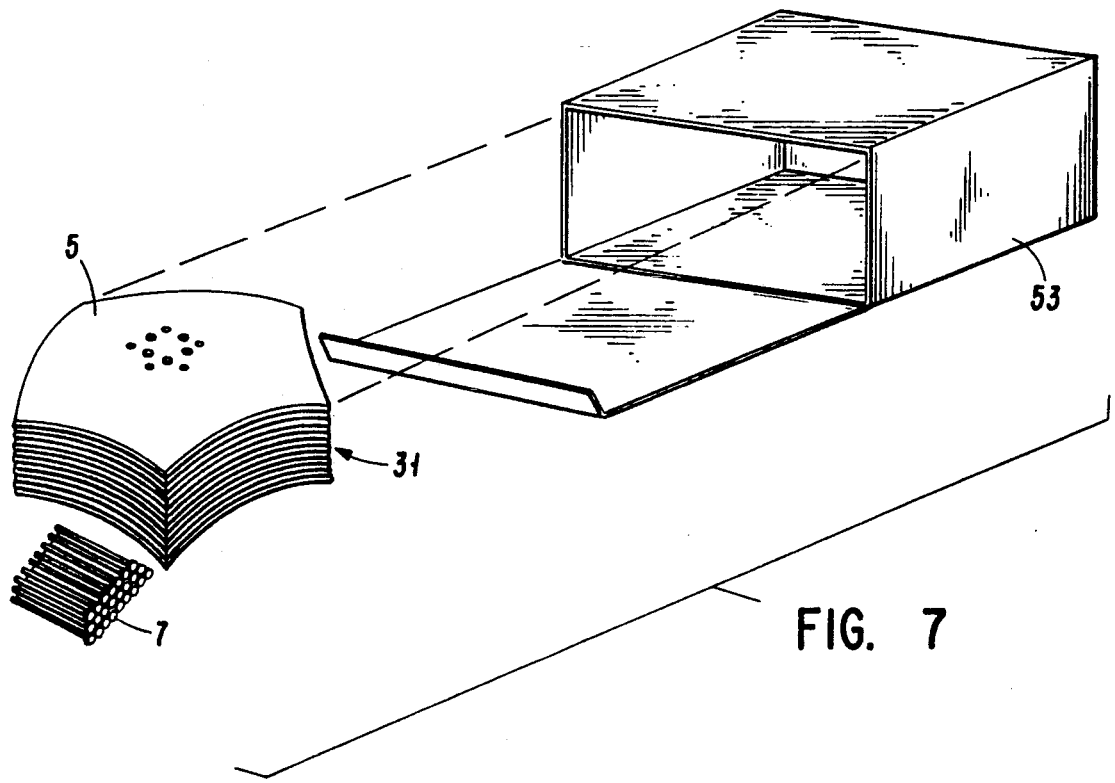
FIG. 7 is a front perspective view of the invention in a disassembled state with a packaging or storage container.

The container 2 in FIG. 1 is an insulated sphere assembled from a plurality of polygonal plates 5 which in the preferred embodiment are pentagon-shaped. When assembled, the container 2 is structurally able to retain its shape when filled completely with heavy wet grass clippings or other biodegradable waste materials. The container 2 is also able to maintain its shape with any one panel 5 removed, and while loaded with the same wet heavy materials. Its shape facilitates easy transporting and stirring of contents by rolling. Its shape also facilitates transporting as a stack 31 of disassembled panels 5 nested together as shown in FIG. 7. The combined weight of the panels 5 is between twenty-four and forty-five pounds depending on the diameter of sphere 2. The outside diameter of container 2 is dependent on the size and geometry of the panels 5 which in the preferred embodiment are selected to provide a spherical container 2 of diameter in the range from thirty-two inches to greater than seventy-six inches depending on the desired container volume.

Figure 3:
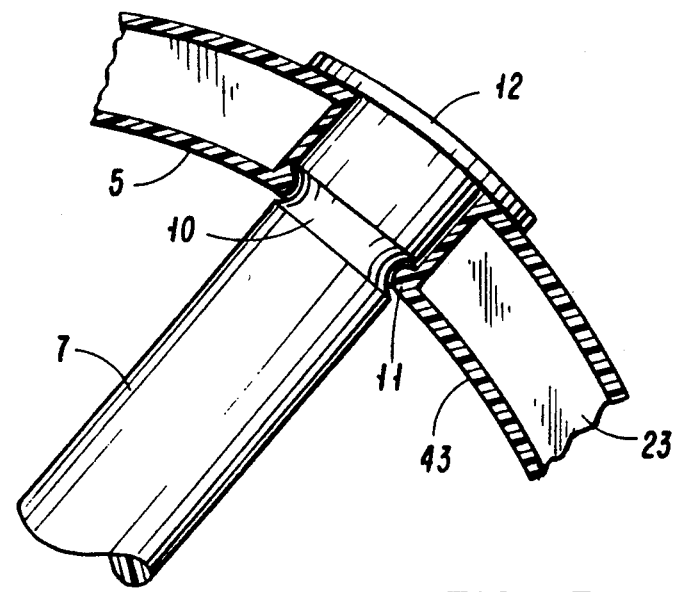
FIG. 3 is a close up view, in cross section, of a segment of a panel showing a rod mounted within an opening in the panel.

Each panel 5 is hollow and made from ultraviolet-stabilized polyethylene or other plastic or low thermally conductive material suitable for an outdoor environment. The total panel thickness including the trapped air gap 23 in the preferred embodiment, varies from 3/16 inch to one inch or more, with the thickness of the plastic wall 25 used in each panel being about 1/16 inch. As shown in FIG. 3, each panel 5 has five molded holes 13 located on an approximate five-inch diameter circular pattern at the panel center, for the purpose of accepting the plastic rods 7. Each panel 5 also has one gas exchange hole 16 located at the panel center. The gas exchange holes 16 are approximately one-half inch in diameter.

Figure 9:
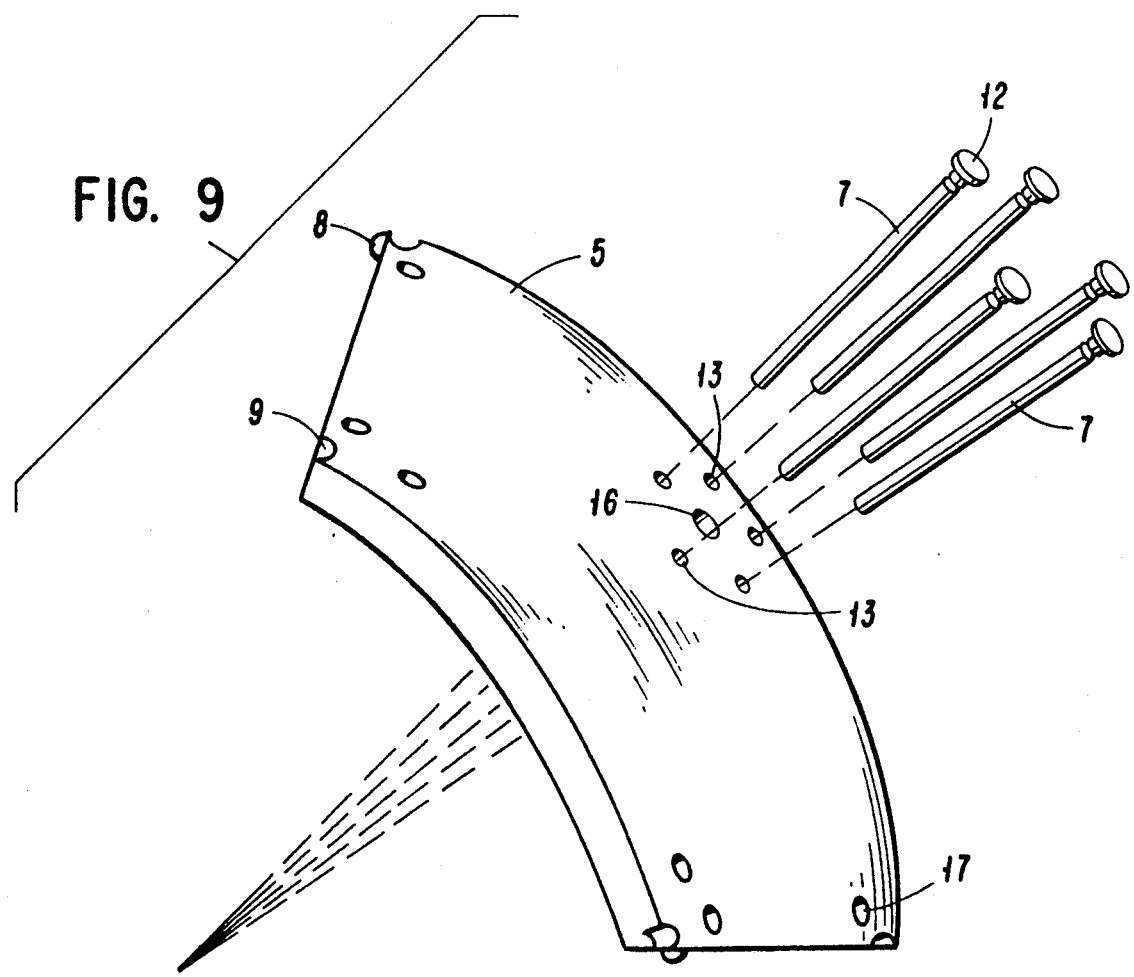
FIG. 9 is a perspective view of one curved panel of the invention shown with its associated rod members exploded from their respective mounting position within the panel.

As seen in FIG. 9, the panels have stabilizing tabs 8 and depressions 9 for receiving stabilizing tabs 8, on each of the panels 5. As the panels 5 are assembled into a spherical shape, the stabilizing tabs 8 overlap depressions 9 on adjacent panels, creating a stabilizing effect for the location of each panel 5 when the panels 5 are in their assembled positions.

Figure 4:
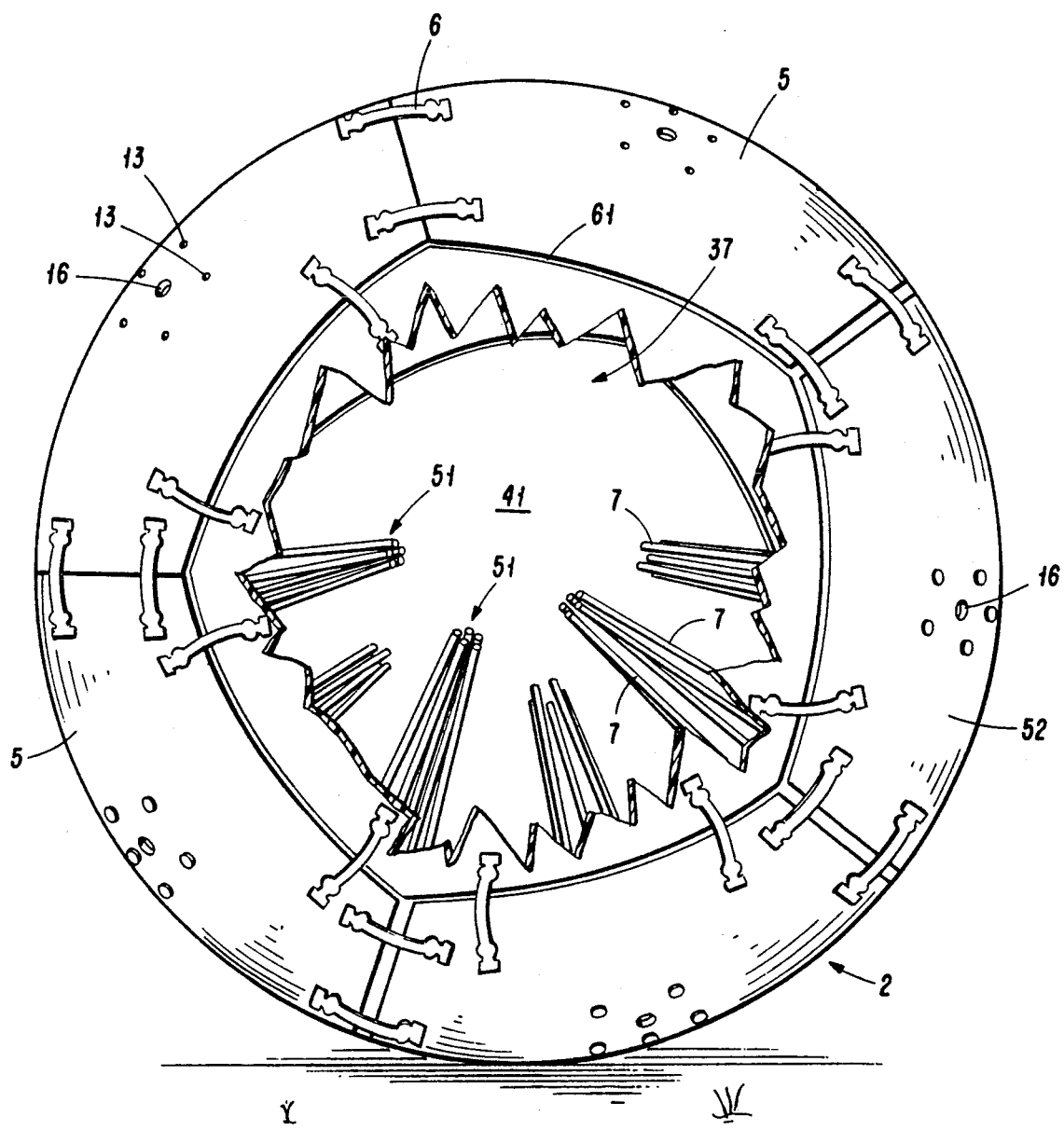
FIG. 4 is a front elevation of the invention with a part cut away showing the internal pyramidal groups of rods.

The internal surface 37 of the container 2 is smooth and spherical except for six intruding tapered structures 51 made of five plastic rods 7 each which are visualized in FIG. 4. The plastic rods 7 that intrude from the center of each pentagonal panel 5 toward the container center 41, are attached to the container wall 43 only. The plastic rods 7 are made of molded plastic or other light weight material. The shape of tapered structures 51 is narrower at the container center 41 and widest at the internal surface 37 of the container 2. Tapered structures 51 may take a generally pyramidal shape, a conical shape, or other geometries, depending on the relative location of a set of holes 13 on a panel 5.

FIG. 9 shows one panel 5 with five plastic rods 7 prior to assembly. As shown in FIG. 9 the plastic rods 7 are mounted by pushing them through the panel 5, snapping into place without fasteners. It is seen in FIG. 3 that the plastic rods 7 have a ring groove 10 that seats in a molded ring 11 which is part of the panel 5. The molded ring 11 is integrally molded to the panel 5. The plastic rods 7 are about one-half inch in diameter and about twelve inches long each having a head 12 of diameter of less than one inch.

The container 2 will compost its contents primarily in a stationary position, with the bottom hemisphere 52 containing the plastic rods 7, to be located nearest the ground as in FIG. 4. This orientation will permit the container contents to settle on top of and around the rods 7 as rods 7 will be pointing primarily upward. This sphere orientation facilitates continuous slow gas exchange within the bottom hemisphere 52. Gas exchange takes place within hollow gas passages consisting of the gas exchange holes 16, and the unobstructed volume of space existing within the internal tapered structures 51 formed by groups of plastic rods 7. Atmospheric gas passes through the gas exchange holes 16 and reacts with the gases and solids in the immediate vicinity of the tapered structures 51. Reaction by-products such as gases, water, and water vapor either gravitate or travel by convection from the gas passage within the tapered structures 51, out of the sphere through the gas exchange holes 16.

Figure 8:
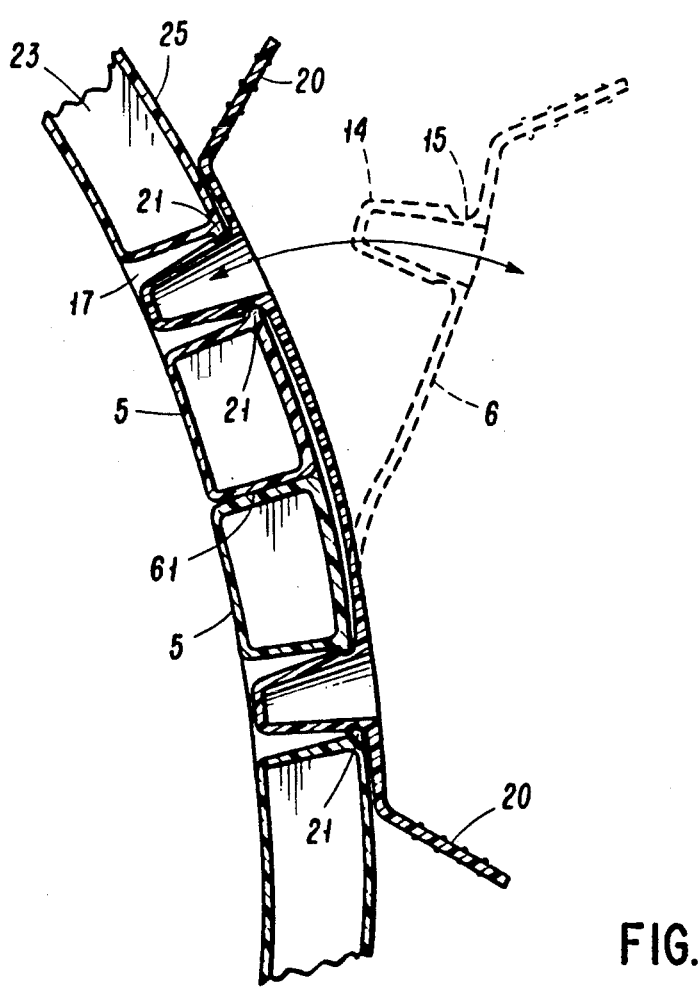
FIG. 8 is a cross sectional view of part of the sidewall of the invention, showing two adjacent wall panels and one fastening strap in position retained to the panels, with the strap shown in phantom in a partially detached position.

The panels 5 fasten together as shown in FIG. 8. Each panel 5 is attached to another panel by two panel fastening straps 6 made of plastic. Each panel fastening strap 6 has two male buttons 14. At the location on the panel fastening strap 6 where the male button 14 attaches to the strap 6, there is a recess 15, which may be annular, on the male button 14. This recess 15 receives protrusions 21 of attachment holes 17 located on each panel 5. Each panel fastening strap 6 has two pull tabs 20 for the purpose of removing the panel fastening strap 6 by pulling the pull tab 20 radially outward from the container 2. There are sixty panel fastening straps 6 required to assemble one spherical container.

In FIG. 1, the panel 5 is located in assembly by the edges 49 of the nearest five adjacent panels. Each edge 49 is tapered such that a panel 5 is wider at its outer wall than at its inner wall. The adjacent panel edges 49 of each panel 5 of the container 2, touch the edges 49 of the removed panel 5 as it is brought closer to the center of the container 2, thus creating a final resting place for the removed panel 5 as it is returned into place on the container 2. The result is panel location by panel edge contact combined with panel fastening straps 6, completing a spherical ball which has nearly air tight seams 61.

Figure 2:
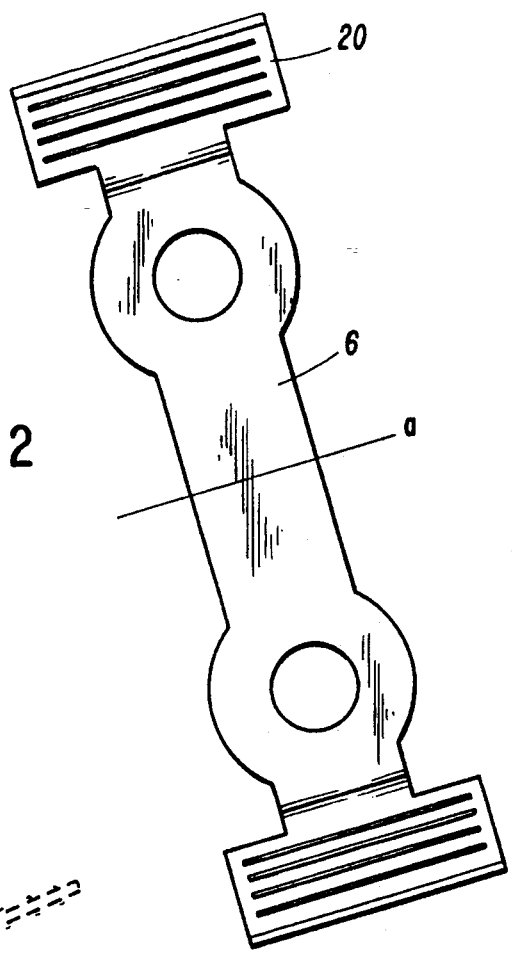
FIG. 2 is a plan view of the fastening strap of the invention.

FIG. 2 illustrates a strap 6 in a plan view. Strap 6 is an elongated flexible member having an upturned pull tab 20 on each end. Strap 6 is symmetrical relative to reference line a.

Figure 5:
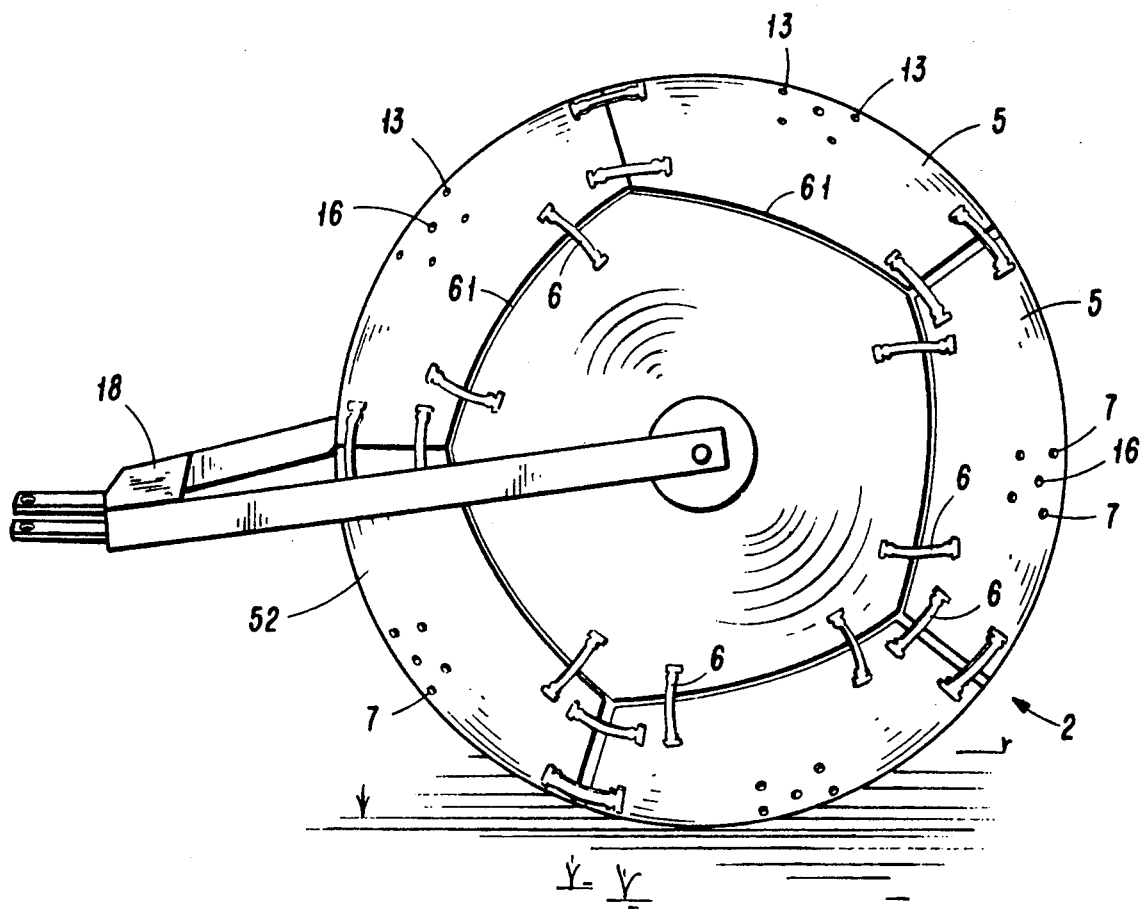
FIG. 5 is an elevation view of an alternative embodiment of the invention which is provided with a draw bar for towing.

FIG. 5 discloses an alternative embodiment of the invention wherein the container 2 is provided with a tow bar 18 fixed thereto at an axis of container 2. Because of the spherical shape of container 2, container 2 may be easily drawn along the ground as it easily rolls. In rolling, the contents thereof may be redistributed and agitated by the action of pyramidal structures 51 which penetrate the interior of the container 2 from the lower hemisphere 52 thereof.

Figure 6:
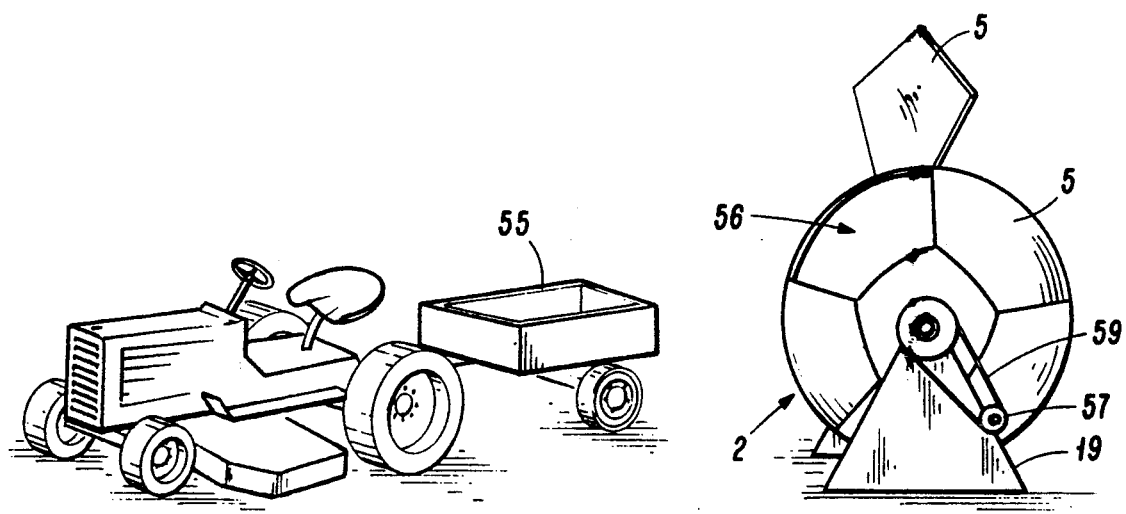
FIG. 6 is a perspective schematic view of an alternative embodiment of the invention mounted to a stationary frame, the container being motor driven, and shown with one panel displaced to provide an opening for insertion or removal of composting material.

Another alternative embodiment of the invention is disclosed in FIG. 6 where container 2 is mounted on supporting frame 19 where it may be driven in rotation by motor 57 and drive belt 59. One panel 5 is shown temporarily displaced from its closed position, providing a port 56 through which material taken from cart 55 may be inserted.

FIG. 7 illustrates a suitable packaging and storage arrangement which employs a box 53 sized suitably to receive stack 31 of panels 5 along with rods 7. It can be seen that the invention is conveniently stored in a disassembled state.

This invention may be purchased in a compact disassembled nested state as shown in FIG. 7. The consumer must assemble it prior to its use. Assembly is about a ten-minute process whereby the plastic rods 7 are pushed through molded holes 13 in a panel 5 as shown in FIG. 3. Six panels 5 will assemble with five plastic rods 7 per panel 5, totalling thirty plastic rods 7 per spherical container 2. The six panels 5 containing the plastic rods 7 are then attached to each other by use of panel fastening straps 6. The six panels 5 with plastic rods 7 comprise one hemisphere, to be mated with the other hemisphere consisting of six panels 5 having no rods 7. The sphere panels 5 need not be assembled one hemisphere at a time, but may be randomly assembled so long as the plastic rods 7 are part of only one hemisphere of the container 2. A panel 5 may also be assembled into the sphere in any of its five natural orientation positions and may be interchanged with any other panel within the same hemisphere.

The plastic rods 7 are assembled by force, through a premolded hole 13 in each panel 5 that has a snap-ring/- groove or other integral fastening structure integrally molded into the panel. As the rod 7 is forced from the outer convex surface of the curved panel 5, through the panel wall, toward the center 41 of the sphere, the ring groove 10 approaches a matching molded ring 11 at the final resting place of the rod 7 in the panel 5. The final resting place is recognized when the rod head 12 of the plastic rod 7 is snugly touching the outer curved surface of the panel 5. Simultaneously, the molded ring 10 of the panel drops into the ring groove 11 holding the rod 7 in place without any other means. The rod diameter is of a size such that it fits snugly with the molded hole for rods 13.

The panels 5 are fastened to each other along a spherically curved seam 61. Each panel has ten attachment holes 17 for panel fastening straps 6 which mate with the male buttons 14 of the panel fastening straps 6 at assembly. Two panels 5 are fastened to each other by bringing the panel edges 49 into contact with each other while aligning with the natural curvature of the panels 5, and then inserting the male button 14 of the panel attachment straps 6 into the attachment holes 17. As shown in FIG. 8 the panel attachment strap 6 is pushed radially toward the center 41 of the sphere under force, until the recess 15 of the male button 14 snaps into the protrusion 21 of attachment hole 17 of panel 5.

Once assembled the panels 5 resist any radial movement by the contact made between the overlapping stabilizing tabs 8 and the under lapping stabilizing depressions 9, and by the surface tension maintained by the panel fastening straps 6.

To fill, empty, add water to, or access the internal components of the container 2, a panel 5 may be removed by snapping or unsnapping the panel attachment straps 6 and removing an individual panel. A popping or unpopping action will occur both in unfastening or fastening the panel 5 chosen for sphere access.

OPERATION OF INVENTION

To perform composting using assembled container 2, the container 2 may be rolled to any location within the user's premises. With one panel 5 removed, yard waste may be placed into the interior of the container 2, or internal contents of the container 2 may be removed by either rotation of the container 2 such that the opening created by removal of a panel 5 in the sphere is downward, or by extraction of the contents with a hand tool through the opening created by removal of a panel 5.

The rate of gas and water vapor exchange with the environment external to the container 2 is extremely slow and the container 2 will act to contain nearly saturated amounts of water vapor.

The container 2 will periodically be rolled to effect a change in the uniformity of texture, moisture, and reaction heat sources within the contents, always returning it to rest on the proper hemisphere. The user may roll the container 2 daily. Rolling will distribute the waste material which is in the localized proximity closest to the tapered structures 51, to other locations within the sphere. At the same time, waste material that is not near a tapered structure 51, will be brought to a close proximity of a tapered structure 51 and will be exposed to the gases and water vapor within the tapered structures. The most efficient waste degradation takes place nearest a tapered structures 51.

The rotation also assists to replenish the reaction by-product gases within the tapered structures, with reaction fuels such as water vapor and oxygen. The distribution of the advanced degraded waste which has density of up to three times the density of unreacted waste, to locations not near a tapered structure 51, will introduce heat sources and enzymes to portions of the container contents that may not be degrading as vigorously as in the regions near the tapered structure 51. This distribution contributes to increasing reaction speed by spreading heat uniformly throughout the container 2, thereby effecting a reduction in the number and size of undesirable hot spots and cold spots.

Rolling of the container 2 also conditions the shape of the degraded waste within the container into small sphere-like balls of one to two inch diameter. Following twelve days of degrading, the reacted compost sphere-like nuggets may be emptied or removed from the container, or continually processed with newly added waste.

The modular construction of this container 2 facilitates disassembly for storage in the off season. All panels 5, plastic rods 7, and panel fastening straps 6 can be stored in the original purchase container 53 as shown in FIG. 7.

Having described the invention, I claim:

1. A compost container comprising
   a multiplicity of curved panels, which when placed edge to edge form a curved enclosure,
   each panel having a plurality of openings therethrough,
   a plurality of rods, selectively insertable within the openings of a first portion of said panels and retainable therein,
   at least one passageway in each of said panels communicative between the interior of said enclosure and the exterior of said enclosure.

2. The container of claim 1 wherein
   said rods having first ends which protrude into the interior of said enclosure,
   the first ends of the rods inserted in each one of said first portion of panels forming a tapered structure.

3. The container of claim 1 wherein
   said enclosure comprising a spheroid with a first hemisphere and a second hemisphere,
   said rods inserted within the panels of the first hemisphere.

4. The container of claim 1 wherein
   said panels are interfastened by a plurablity of straps, each of which engages adjacent panels.

5. The container of claim 4 wherein
   said strap members having two ends, each end having a protruding button thereon,
   each panel having depressions therein to receive the protruding buttons of said straps.

6. The container of claim 1 wherein
   said panels comprising curved plates each having an outer surface and inner surface in spaced apart interrelationship,
   said panels having sidewalls interconnecting the said outer surface and an inner surfaces thereof,
   said panels enclosing spaces having insulative media therein.

7. The container of claim 1 wherein
   said panels each having at least one coplanar protrusion extending from each edge thereof,
   said panels having at least one recess on each edge thereof complementarily positioned to receive the coplanar protrusion of the edge of each adjacent panel.

8. The container of claim 1 wherein each of said rods having an expanded head thereon, each of said rods having an annular groove therealong and spaced apart from said head, each of said openings of said panels having an annular ring therein receivable within said grooves of said rods when said rods are inserted in said openings.

9. The container of claim 5 wherein each end of said straps having an extension depending upward therefrom.

10. the container of claim 1 wherein said rods having first ends which protrude into the interior of said enclosure, the first ends of the rods inserted in each one of said first portion of panels forming a tapered structure, said enclosure comprising a spheroid with a first hemisphere and a second hemisphere, said rods inserted within the panels of the first hemisphere, said panels are interfastened by a plurability of straps, each of which engages adjacent panels, said panels comprising curved plates each having an outer surface and inner surface in spaced apart interrelationship, said panels having sidewalls interconnecting the said outer surface and an inner surfaces thereof, said panels enclosing spaces having insulative media therein, said panels each having at least one coplanar protrusion extending from each edge thereof, said panels having at least one recess on each edge thereof complementarily positioned to receive the coplanar protrusion of the edge of each adjacent panel.

* * * * *